United States Patent [19]
Kopernik
[11] 3,952,123
[45] Apr. 20, 1976

[54] INJECTION MOLDING A PLASTIC ARTICLE HAVING A DENSITY APPROXIMATING WOOD

[75] Inventor: Dror Kopernik, Chicago, Ill.
[73] Assignee: Turner Manufacturing Company, Chicago, Ill.

[22] Filed: Apr. 19, 1974
[21] Appl. No.: 462,332

Related U.S. Application Data

[60] Continuation-in-part of Ser. No. 237,473, March 23, 1972, abandoned, which is a division of Ser. No. 460,791, April 15, 1974.

[52] U.S. Cl. ........................ 428/178; 264/41;264/48; 264/DIG. 14; 428/219; 428/310; 428/332
[51] Int. Cl.$^2$ ........................ B29D 27/00; B29F 1/00
[58] Field of Search .............. 161/159, 166; 264/41, 264/48, 51, 47, DIG. 14, 83; 40/154; 260/2.5 R, 2.5 AZ; 52/716, 290, 309; 428/159, 310, 311, 315

[56] References Cited

UNITED STATES PATENTS 3,644,168 2/1972 Bonk et al. ........................ 161/166

OTHER PUBLICATIONS

Ferrigno, Rigid Plastics Foams, Reinhold Pub. Corp., N.Y., 1964, pp. 166–167.
Union Carbide, Structural Foam, May 1973, pp. 5–8.
Europlastics Monthly, Oct. 1973, pp. 77–80.

*Primary Examiner*—Harold Ansher
*Assistant Examiner*—Paul J. Thibodeau
*Attorney, Agent, or Firm*—Norman Lettvin

[57] ABSTRACT

A shaped, elongated board having shaped face surfaces is formed of a foamed thermoplastic material and may be substituted for wood or composite moldings which are now used in the manufacture of frames for pictures and the like. The molded board has a cellulated interior and a density that varies continuously between a greatest density at the outer surface of the board to a least density at the greatest spacing inwardly of said surface and without discreted delineation between the relatively denser surface and the lesser dense interior of the board. The average bulk density of such a product is in the range of between about 24.7 and 33.5 lbs. per cubic foot, which is approximately equivalent to that of natural wood. The board has a good quality surface finish and where appropriate can accurately replicate an ornamental surface design for the finished frame. The molded board can be subsequently processed in the same manner as present wood moldings with existing production tooling and equipment. This processing includes cutting, joining and surface-finishing such as painting and antiquing.

A process for manufacturing the board is provided in which a foamable polymeric material is mixed with a blowing agent in particular proportions and aliquot portions of the mixture are then injected directly into an elongated mold through a plurality of closely-spaced injection nozzles.

3 Claims, 7 Drawing Figures

INJECTION MOLDING A PLASTIC ARTICLE HAVING A DENSITY APPROXIMATING WOOD

CROSS REFERENCE TO RELATED APPLICATION

This application is a continuation-in-part of my copending applications, Ser. No. 237,473 filed Mar. 23, 1972 and now abandoned and Ser. No. 460,791 filed Apr. 15, 1974, the latter application being a division of the former application.

BACKGROUND OF THE INVENTION

This invention relates to the manufacture of structural foam thermoplastic boards which may be substituted for wood or composite molding which are presently used in the manufacture of picture frames and the like.

The vast majority of frames for pictures, mirrors and the like are presently manufactured by shaping an elongated wood board to a particular profile by milling, shaving, and other similar operations. As used herein, a board is defined as an elongated body of relatively little thickness, but of substantially greater width and very much greater length.

The elongated boards are decorated by several different methods. One method is to profile the entire board with a longitudinal design such as a groove or the like by a milling-like operation. Thus, the profile or cross-sectional shape along the entire length of the board is identical. A board profiled as described above can be used as is to form a frame or be further decorated.

Embossing by pressing or burning a design into the surface of a profiled board is one way to further decorate the board. Another technique by which a profiled board can be decorated is to apply, by extruding, a formable coating material to one or more surfaces of the profiled board, then roll the ornamental pattern into the material by contacting the coated board with a transversely-aligned impression roller, and permit the coating to harden. Whether using wood or coated composite moldings, the moldings are miter-cut to length and the miter-cut faces are slotted to receive a corner-joining clamp nail, and the corners are then fitted together and glued to form the completed frame. The frame may be painted, antiqued or otherwise surface-decorated prior to the cutting, slotting, and mitering operations.

The shaping of the wood to provide the desired profile and application of the ornamental surface represents a substantial portion of the cost of manufacturing frames. Various attempts have been made to reduce the manufacturing cost of frames. The principal one is the injection, transfer, compression molding or casting frames in their entirety in various plastic materials. In theory, the wood-shaping and application of the ornamental surface could be avoided by this technique and in the normal assembly of the frame pieces eliminated. However, because of the basic densities of plastics (60 to 80 lbs. per cubic foot) and/or the difficulty (in terms of molding time and, therefore, capital investment) in manufacturing thick sections, such frames have either been unacceptably heavy (except in very small sizes) or far more expensive than their wood counterparts. Furthermore, these have had a back hollowed out in such a fashion to give an unmistakable synthetic and "plastic" appearance and limberness, which has made them of considerably less value in the market place than an actual wood frame.

U.S. Pat. No. 3,268,636 discloses a lighter weight cellulated or foam structural plastic and a process for injection-molding the material therein to achieve molded bodies that are less dense (about 47 lbs. per cubic foot) than may be achieved with an injection-molded plastic and which also provides a relatively good surface finish. It was at first thought that the plastic process and machine disclosed in the said patent could achieve duplication of wood board as desired for use in production of frames. Early attempts to further reduce the density of the plastic to approximately that of wood (24–35 lbs. per cubic foot), while still retaining the other favorable properties of the process were unsuccessful. The lowest densities that could be achieved were about 40 lbs. per cubic foot, but then the inner cellular structure of the board-like product included very large internal voids which weakened the product and presented problems in fabricating the frame using standard frame manufacturing procedures and tooling. Furthermore, it was found that a good quality surface was difficult to achieve.

Relatively very low density replica wood beams can be manufactured in molds from urethane foam as disclosed in U.S. Pat. No. 3,561,181, wherein plastic of 2–6 lbs. per cubic foot is confined when molded to provide an average density of about 8 lbs. per cubic foot. However, such articles would not be suitable for the purposes of this application for use as moldings in that such construction would not provide the "heft" or weight which a frame purchaser expects, and such moldings are believed to be incapable of being integrated into existing frame production procedures without extensively changing the tooling and manufacturing procedures. While the same patent suggests foaming a more dense urethane plastic in open-sided molds to provide replica wood panels, it will be evident that the desirable features of a densified skin on all surfaces precisely replicating molding detail and surrounding a cellulated interior, as obtained by foaming under pressure with a totally confined mold, cannot be achieved.

Thus, an object of this invention is to provide a low-cost injection-molded cellulated board-like product which may be substituted for currently available wood or composite moldings in the manufacture of picture frames and the like, and which may be handled as a substitute wood product without changing other existing manufacturing procedures and equipment.

Another object of this invention is to provide a molding process whereby foamed thermoplastic board-like products can be produced which have a density similar to that of wood, of about 24.7 to 33.5 lbs. per cubic foot.

Yet another object is to provide molding equipment for use in manufacturing wood-like foamed thermoplastic boards.

Yet a further object is to provide a foamed thermoplastic board having an integral ornamental surface, which board is more economical to manufacture than previous constructions.

These and other objects of the invention will become apparent from the following description and appended claims.

SUMMARY OF THE INVENTION

By virtue of this invention there is provided an elongated body, or board-like product, which has a density of about 24 to 35 lbs. per cubic foot, a good surface finish, and other properties which permit it to be substituted for the shaped, wood or composite moldings, in the manufacture of frames for pictures, mirrors and the like. A novel apparatus is provided for injecting known foamable polymeric materials in aliquot portions simultaneously into an elongated mold through a plurality of relatively close-spaced nozzles so as to produce an elongated body of the desired density and internally cellulated character. The nozzles are located close together, not in excess of about 12 inches, but under some conditions for some profiles as close together as physical dimensions permit. Furthermore, the nozzles are no more than 6 inches from any restraining surface and are in direct communication with the source of foamable polymeric materials to be injected. The runners or sprues which are normally employed in injection-molding equipment and extend from a reservoir of moldable material to the injection point have been eliminated or reduced by locating the reservoir more closely adjacent the injection nozzles. In the preferred embodiment, a mixture of foamable polymeric material and blowing agent, at a known condition for injection, and which consists essentially of about 98.75 percent polystyrene and 1.25 percent blowing agent is to be injected into the mold cavity, the mixture being held in the reservoir under pressure and temperature conditions which prevent foaming, and the desired board-like product of reduced density is produced by injecting the plastic in aliquot portions simultaneously into an elongated mold cavity through a plurality of the nozzles, at which point the respective aliquot portions of the mixture foam, press against each other and merge to provide a cellulated board having the desired characteristics.

DESCRIPTION OF THE PREFERRED EMBODIMENTS

Figure 1:
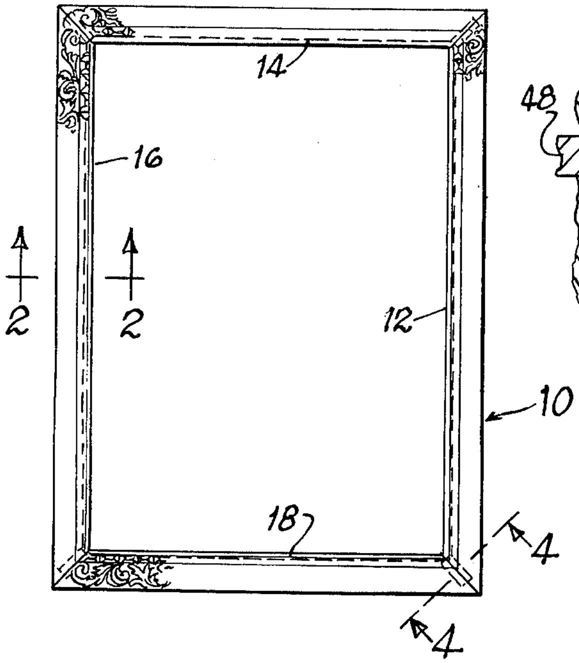
FIG. 1 is a front elevational view of a picture frame fabricated of molded boards made in accordance with this invention.

Referring to the drawings, there is shown a picture frame, 10 generally, which is fabricated of foamed thermoplastic boards 12, 14, 16 and 18 made in accordance with this invention. The molded shape of the board provides the desired profile for use in framing and if it is so desired, an integral ornamental surface design which is fluted, fretted, or scroll-like. The surface design is achieved by providing the mold cavity surface with the negative image of the ornamental surface design. In general, the boards made in accordance with this invention accurately replicate the mold cavity surfaces and provide a good surface finish. These boards may be manufactured in any desirable length, and the width and thickness of the board can be varied in accordance with the frame design. In one embodiment, the board is about 3 inches wide and about 1 inch thick.

The boards as made herein have a dense surface 20 and a cellulated or foamed core 22. The density varies continuously between greater density at the surface and lesser densities at distances further from the surface, but without a discrete delineation between the surface and the interior of the board. The average or bulk density of the entire body, depending on the materials selected, can range between 24.7 and 33.5 lbs. per cubic foot, which is in the same range as the density of natural wood.

For comparison a prior art composite molding 21 is shown which includes a wood substrate 23 and a formable coating 25 in which the ornamental surface design is impressed.

The materials from which the molded board may be fabricated are generally characterized as a foamable polymeric material and a blowing or cellulating agent, as disclosed generally in U.S. Pat. No. 3,268,636. The preferred foamable material is polystyrene, and more particularly the impact polystyrene sold under the trade designation "Amoco M-9", by Amoco Chemicals Corp., Chicago, Ill.; while a preferred blowing agent is a nitrogen-type material such as the material identified by the trade name "Celogen AZ" and sold by Uniroyal Chemical Division of Uniroyal Inc., Chicago, Ill.

Figure 3:
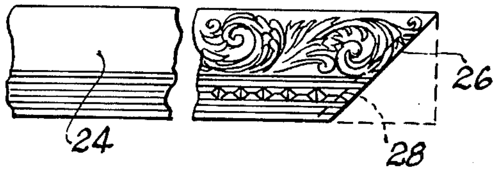
FIG. 3 is a fragmentary elevational view of a molded board after being miter-cut and slotted as in established processes.
Figure 5:
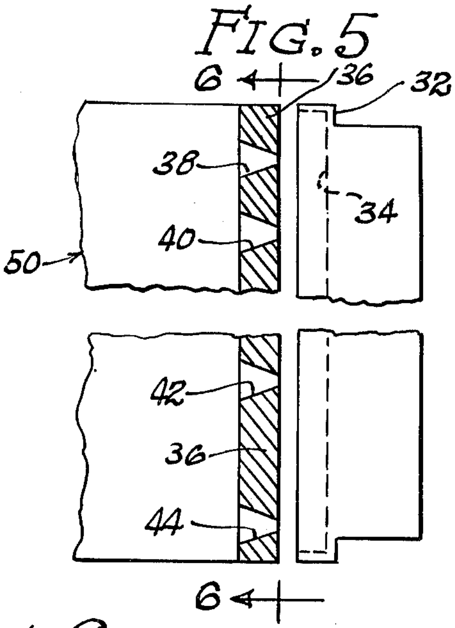
FIG. 5 is a fragmentary, diagrammatic, partial sectional view of the molding apparatus illustrated in FIG. 2.
Figure 4:
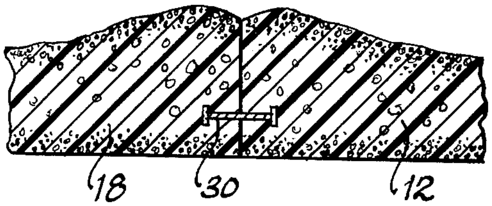
FIG. 4 is a sectional view taken substantially along line 4—4 of FIG. 1 showing the corner joint utilizing the known joining-clamp nail.

The boards as shown herein have a shaped face which includes a scroll-like design. The board 24 as shown in FIG. 3 is formed into a frame molding by miter-cutting the end 26 of the board to length, slotting or cutting the miter-cut face to provide a kerf or slot 28 which receives the corner-joining clamp nail, and then joining and cementing the two sections to form the mitered corner. A joined corner is shown in FIG. 4 where the I-shaped clamp-nail 30 secures the boards 12 and 18 together. Decorative finishes in the form of painting or antique finishes can then be applied to the surface of this body.

The boards are manufactured by a molding technique wherein a movable mold plate 32 having an elongated mold cavity 34 is provided which is arranged to abut a cavity-closing match plate 36 that carries a plurality of integral injection nozzles 38, 40, 42 and 44. Where complex or under-cut profiles are to be made, rabbet bars such as 46 and 48 are provided. The remainder of the molding apparatus is essentially the same as is commercially available. In part the ability to form the cellulated and molded board as described herein is believed to be due to the use of a plurality of nozzles which permit simultaneous injection of aliquot portions of the foamable polymeric material into the cavity.

The reciprocally-movable, cavity-defining mold plate 32 moves between a cavity-closed position where it is in engagement with a stationary match plate 36 and a cavity-open retracted position. The injection nozzles 38, 40, 42 and 44 are arranged to inject the foamable material directly into an elongated cavity 34 in a direction transverse to the length and width of the cavity. The injection apparatus 50 includes the foamable material reservoir, pressurizing means and flow-control mechanism, as is standard in the art and commercially available.

Figure 6:
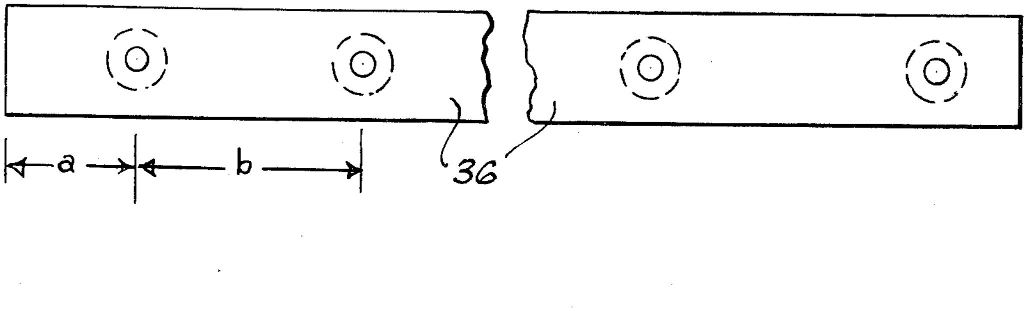
FIG. 6 is a fragmentary front elevational view taken substantially along line 6—6 of FIG. 5 showing the lay-out of nozzles for simultaneously injecting aliquot portions of the foamable material into the molding cavity.

The nozzles 38, 40, 42 and 44 are arranged such that the exit ends of adjacent nozzles are 12 inches apart as shown at *b* in FIG. 6, and the end nozzles 38 and 44 are approximately six inches from the mold ends as shown at *a* in FIG. 6. This nozzle arrangement permits the cavity 34 to be quickly and simultaneously filled from all nozzles with foamable material, and also reduces the maximum unilateral distance the foamable material has to travel or flow from each nozzle inlet within the mold cavity. In general, it is desirable that the foamable material flows laterally as short a distance as possible. A flow path of about 6 inches from the exit end of each nozzle is ample. As will be understood by one skilled in the art, the foamable material rapidly expands in the cavity under the action of the blowing agent, and once the mold is filled or substantially filled, the cellulated core continues to expand and compresses the outermost portions of the material, thereby creating a dense, skin-like surface, but without any discrete delineation between the surface and the cellulated interior. With such nozzle spacing all of the injected foamable material is constrained during foaming by virtue of the mold surfaces and by flowing laterally against other sub-portions of the injected foamable materials, thereby substantially eliminating unconstrained free foaming which could result in the formation of excessively large voids. Thus, in the boards made herein there exists a large plurality of small pores over a range of smallness bounded at an uppermost value of substantially no greater than about three-sixteenths of an inch in diameter and said boards then have the character that they can be readily joined, nailed and otherwise handled in the same manner as wood boards.

The combination of closely-spaced nozzles and short-flow path from the reservoir to the cavity is believed to give the foamable material excellent flow characteristics in the mold cavity so as to yield boards having a desirably high quality surface finish.

Figure 2:
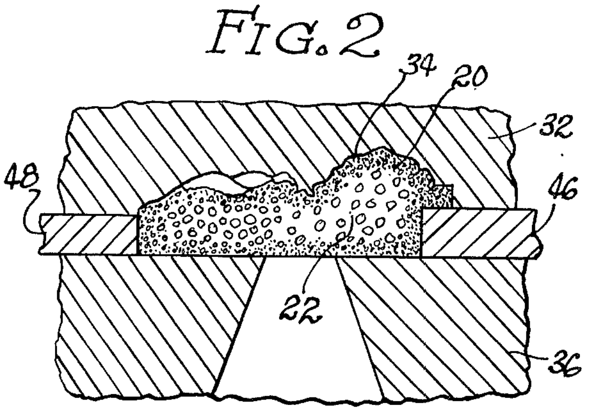
FIG. 2 is a cross-sectional view taken substantially along line 2—2 of FIG. 1 to show a typical form of board, but also showing the board being defined in the cavity-defining mold.
Figure 2A:
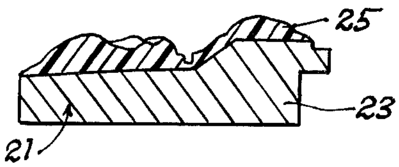
FIG. 2A is a sectional view similar to FIG. 2 but illustrating, typically, a composite molding of the prior art using a wood board as a substrate.

In a specific example, a mold plate having a cast-aluminum cavity and a match plate having a plurality of nozzles approximately 12 inches apart are provided for use with a structural foam machine manufactured by Jarecki Corporation. The cavity and match plate define a mold 48 inches long with a profile as shown in FIG. 2.

A foamable mixture of 98.75 percent polystyrene (identified in the trade as "Amoco G-4") and 1.25 percent Celogen was prepared and held in the reservoir of the machine which was connected to four nozzles in the match plate. The foamable mixture was then injected into the mold, and after foaming and cooling the board was removed and its density was determined to be 24.7 lbs. per cubic foot.

Under the same conditions and in the same proportions as described above, two different impact polystyrenes, identified in the trade as Amoco M-9 and "Amoco M-8", were injected and foamed using Celogen as the blowing agent. The board made using M-9 had a density of about 32.5 lbs. per cubic foot and the board made using M-8 had a density of about 33.5 lbs. per cubic foot.

In two other experiments using a machined cavity plate rather than the previously described cast-aluminum cavity plate and using 1.5 percent Celogen, the general purpose polystyrene G-4 and the impact polystyrene M-9 were injected and foamed. Using a mixture of 98.5 percent G-4 and 1.5 percent Celogen, a board having a density of 26 lbs. per cubic foot was produced, while when using 98.5 percent M-9 and 1.5 percent Celogen, a board having a density of 30 lbs. per cubic foot was produced.

The cellulation of the foamed core 22 produced by the foregoing processes and material combinations was of a fairly uniform range, as indicated in FIG. 2, and there were no unusually large pores or blow holes in the core 22. The material could be easily beveled and slotted as indicated in FIG. 4.

Based upon the examples, the preferred range of polystyrene is between about 98.5 and 98.75 percent and the preferred range of blowing agent is between 1.5 and 1.25 percent.

It will be appreciated that numerous changes and modifications can be made to the embodiments described herein without departing from the spirit and scope of this invention.

What is claimed and desired to be secured by Letters Patent of the United States is:

1. An elongated, synthetic board, molded and formed wholly of a foamed thermoplastic material, that is adapted to be ornamentally shaped as provided by the mold and which has wood-like properties permitting its substitution and use in established processes of manufacture of wood-like frames for pictures and the like, said board being of relatively small thickness and great length as compared to the width thereof and being formed of cellulated polystyrene foam, said board having a continuous relatively denser surface and a lesser dense cellular interior, the density varying continuously between lesser density and greater density and without discrete delineation between the surface and the interior, with the average bulk density of the entire synthetic board being in the range of 24.7 – 33.5 lbs. per cubic foot, and the cellular interior being free of large voids and comprising a large plurality of small pores having a range of smallness bounded at an uppermost value of substantially no greater than three-sixteenths inch in diameter so as to provide a character such that the board can be readily fastened in the same manner as wood boards.

2. A molded board as in claim 1 wherein said board includes an integral ornamental surface design.

3. An elongated, synthetic board, molded and formed wholly of a foamed polystyrene, that is adapted to be ornamentally shaped as provided by the mold and which has wood-like properties permitting its substitution and use in established processes of manufacture of wood-like frames for pictures and the like, said board being of relatively small thickness and great length as compared to the width thereof, and said board having a continuous relatively denser surface and a lesser dense cellular interior, the density varying continuously between lesser density and greater density and without discrete delineation between the surface and the interior, with the average bulk density of the entire synthetic board being in the range of about 24.7 – 33.5 lbs. per cubic foot, and the cellular interior being free of large voids but including a large plurality of small pores having a range of smallness bounded at an uppermost value of substantially no greater than three-sixteenths inch in diameter so as to provide a character such that the board can be readily fastened in the same manner as wood boards.

* * * * *